Oct. 27, 1953 J. C. HOLST 2,657,322
INDUCTION MOTOR WITH SEALED ROTOR
Filed May 18, 1950 2 Sheets-Sheet 1

John C. Holst
INVENTOR.
BY
Attorneys

Oct. 27, 1953  J. C. HOLST  2,657,322
INDUCTION MOTOR WITH SEALED ROTOR
Filed May 18, 1950  2 Sheets-Sheet 2
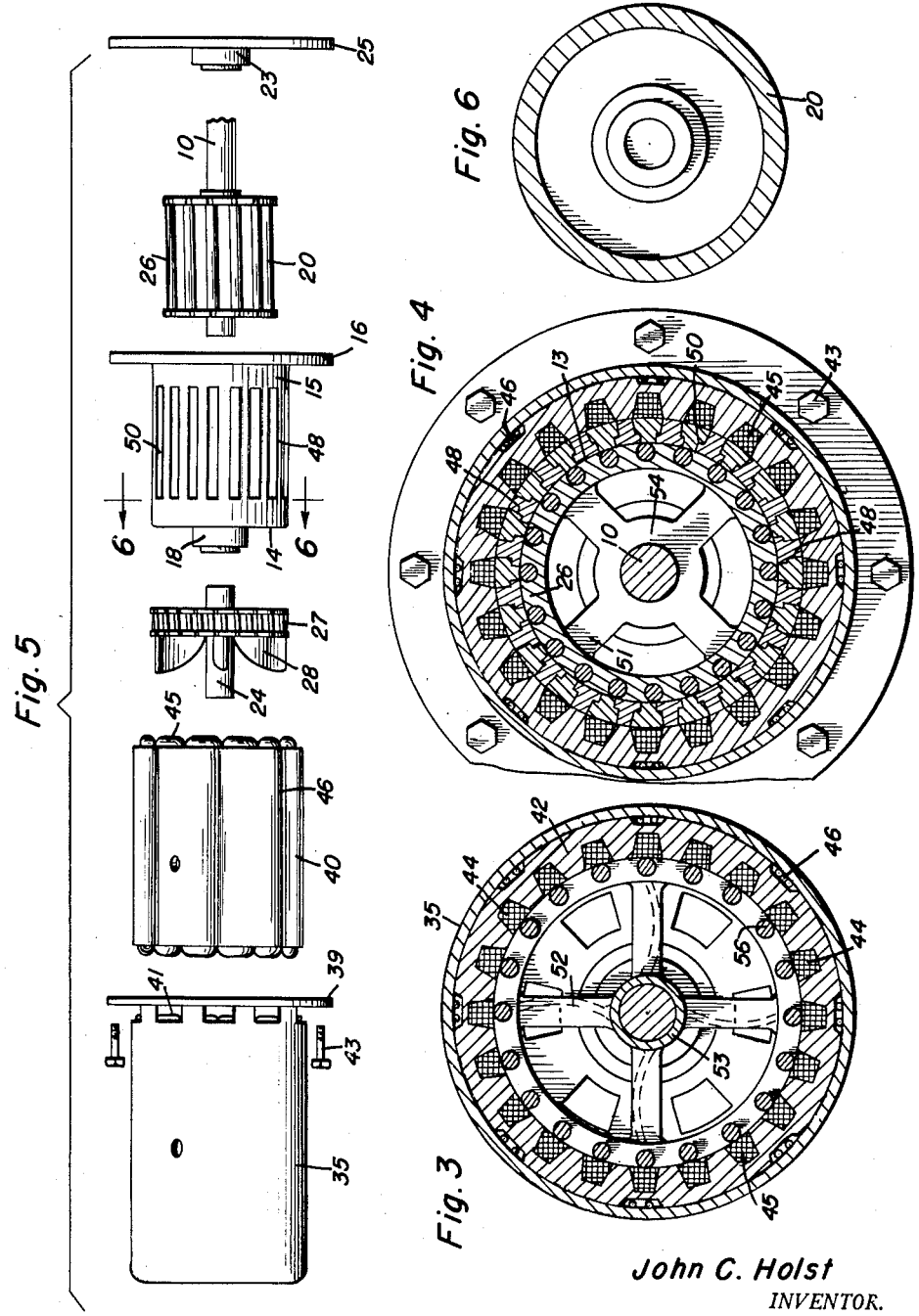
John C. Holst
INVENTOR.

Patented Oct. 27, 1953

2,657,322

UNITED STATES PATENT OFFICE 2,657,322

INDUCTION MOTOR WITH SEALED ROTOR

John C. Holst, Salt Lake City, Utah, assignor of twenty-five per cent to Frank K. Bennie, Trona, Calif., twenty-five per cent to Lynn W. Bennie, Memphis, Tenn., and twenty-five per cent to Lamont Holst, Salt Lake City, Utah Application May 18, 1950, Serial No. 162,700

3 Claims. (Cl. 310—63)

This invention relates to electric motors of the induction type and more particularly to induction motors driving pumps, compressors or other devices, conveying or containing fluids of a dangerous or of a particularly damaging character which should be prevented from reaching the field windings of the electric motor or which should be prevented absolutely from reaching the exterior.

The main object of the invention consists in providing an electric induction motor so constructed that it comprises a completely sealed portion which may be in communication with a device, pump, compressor or the like filled with a fluid of a dangerous or damaging character and a further portion which contains the stator and the field winding which is completely isolated from said sealed portion and is protected by a closed casing with imperforate walls surrounding completely that portion of the induction motor which is exposed to the fluid.

A further object of the invention consists in an induction motor having a stator and a squirrel cage rotor in which the rotor and the rotor shaft is arranged within a completely sealed inner casing with solid imperforate walls while the stator is located outside of said wall, the inner casing thus surrounding a chamber which may be in communication with a space, room or case into which the fluid may penetrate while the said inner casing is itself surrounded by the other parts of the induction motor.

A further object of the invention consists in providing an inner casing within the motor, isolating the rotating parts, which casing is provided with magnetically permeable and magnetically impermeable wall portions, the former conducting the magnetic flux from the stator to the rotor.

A further object of the invention consists in providing the induction motor with an inner completely closed casing and with an auxiliary rotor driving a fan which is located outside of the said sealed inner casing, which auxiliary rotor produces a cooling action adapted to cool those parts of the electric motor which are outside of and surround the said inner casing.

A further object of the invention consists in providing an induction motor driving a pump, compressor or similar device with a stator body surrounded by an outer housing, and surrounding two rotors rotating an independent but aligned rotor shaft, one of said rotors being a shaft projecting outwardly towards the pump or compressor being surrounded by an inner rotor casing of magnetically non-permeable material interposed between the stator and said last named rotor, and having imperforate walls, said casing carrying inserts of magnetically permeable material facing the teeth of the stator body and the other rotor being provided with fan blades producing an air current blown along said stator body between said inner and outer housing.

Further objects of the invention will be apparent from the following detailed specification.

The invention is illustrated in the accompanying drawings showing one embodiment thereof by way of example. It is however to be understood that the example shown is illustrative and has been selected for the purpose to explain the principle of the invention and the best mode of applying the principle. No survey of the possible modifications of the construction has been given in the specification and therefore a departure from the example shown in the drawing does not necessarily involve a departure from the principle of the invention.

In the drawings:

Figure 3 is an elevational sectional view of the induction motor the section being taken along a plane indicated at 3—3 in Figure 2.

Figure 4 is an elevational sectional view the section being taken along a plane indicated at 4—4 in Figure 2.

Figure 5 is an exploded view of all the main parts of the induction motor.

Figure 6 is an elevational cross-sectional view through the rotor of the induction motor the section being taken along line 6—6 of Figure 5.

Figure 2:
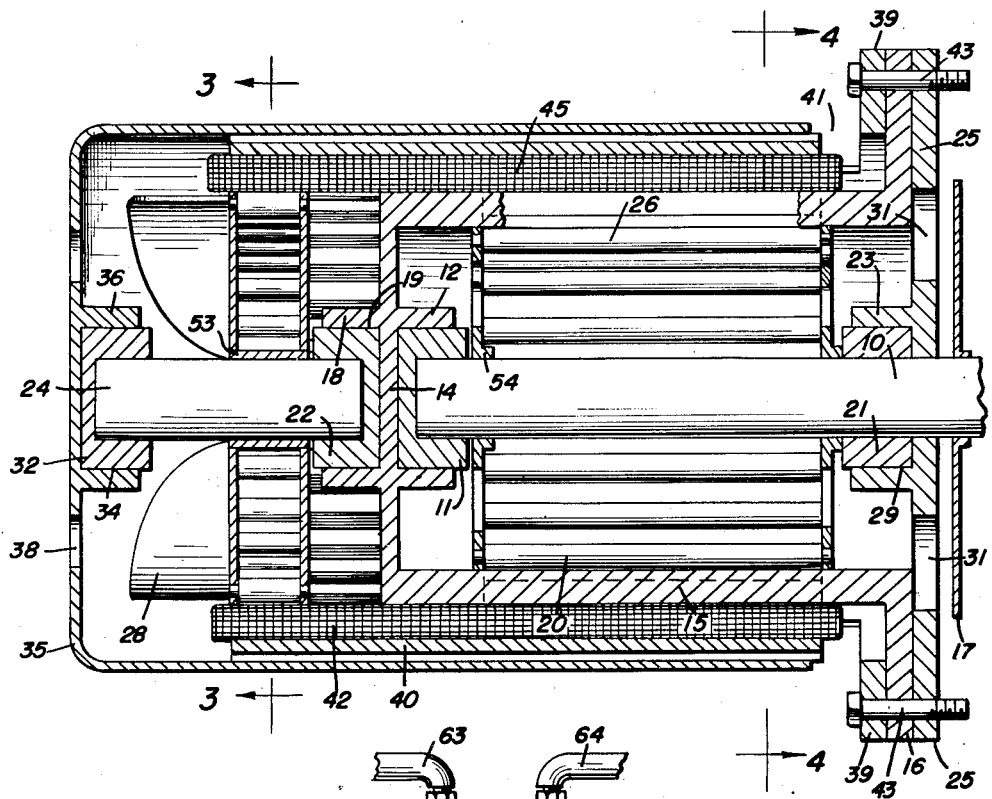
Figure 2 is a sectional elevational view of the induction motor according to this invention the section being taken along the vertical plane of symmetry.

The electric motors are frequently used under conditions which are adverse in every way not only from the electrical standpoint, but also from the standpoint of safe operation or of maintenance. For instance, an electric motor which is coupled with a pump is frequently exposed to the vapors or to the liquid escaping from said pump. Conditions are particularly adverse where such escape is either dangerous or leads to mechanical complications or to corrosion, as is for instance the case with pumps through which certain hydrocarbons such as butane, propane or similar fluids are flowing. In such a case the escaping liquid evaporates and expands during such evaporation, thus producing a refrigerating effect which freezes the liquid in the packing glands, thus causing immobilization of the shaft passing through the said packing glands.

In other cases any vapor penetrating through the packing and reaching the windings of the electric motor would destroy the insulation.

No satisfactory remedy has been found to cope with the difficulties of this type. Stuffing boxes, packing glands and similar devices which are absolutely tight are not available and if packing glands are made tight to such a degree that the leakage is minimized they constitute by themselves such an increase of the load of the electric motor that the plant becomes uneconomical to a high degree. On the other hand even if very small quantities of liquid hydrocarbon are allowed to escape through the gland the pressure difference will cause freezing of the glands and of the shaft passing through it and thus the same kind of undesirable load is produced.

Similar problems occur also in connection with gases or liquids the extreme purity of which has to be maintained so that the sucking in of outer air, for instance, is highly detrimental. The same difficulties arise in connection with highly inflammable or explosive fluids in which leakage in the vicinity of an electric motor, occasionally producing sparks which may ignite the vapors or liquids, has to be avoided at all costs. Where such explosive or highly inflammable fluids are passing the pump, the spark suppressing devices are insufficient, as even the most perfect devices merely counteract a tendency to spark formation in those spots in which sparks otherwise form more or less regularly, while in cases of the above named type even sparks which occur only under abnormal circumstances, for instance in the event of a break down have to be avoided.

According to the invention this problem is dealt with by a special construction of the electric motor to be coupled with a pump, compressor or other fluid conveying or containing device. In order to drive said pump, compressor or other device a shaft, piston rod or the like must pass into the interior of the same, necessitating the use of a packing gland, stuffing box or the like. As in most cases the electric motor used is an induction motor either of the single phase or of the polyphase type having a squirrel cage rotor driving the shaft, the invention consists in arranging the rotor of the electric induction motor in such a manner that a completely sealed chamber is obtained without opening, bore or perforation through which a gas or a liquid may escape. At the end of the chamber which is open the shaft projects and may enter the pump or other fluid conveying device without any packing means or with a normal packing means. The fluid or the vapors may therefore fill the interior of the sealed chamber which also contains the rotor and the shaft and, on account of pressure equalization, or of special pressure conditions any detrimental action of the evaporating fluid and any contact of the same with sparks occurring within the motor even under the most adverse conditions is prevented. Even if a freezing of an evaporating and expanding fluid should occur such an action would be harmless if it merely takes place between parts which are not tightly fitted to each other. Therefore the use of a sealed in rotor running within a completely closed chamber with imperforate walls eliminates the above mentioned grave disadvantages.

The complete closing or sealing of a chamber in which the rotor of the electric motor moves can however be only accomplished with a materially changed construction of the electric motor. In fact a motor construction of this type is electrically at some disadvantage and its efficiency from the purely electrical standpoint is lowered. However these disadvantages are offset by the advantages gained and also by the fact that, even under the most favorable conditions in a case of this type, a motor of normal efficiency on account of the problems involved can only deliver a very small fraction of its power at the pump rotor. Therefore an electric motor, even if of a somewhat smaller electrical efficiency, delivering practically all of its power of the rotor of the device driven, is much preferable and is at an advantage when compared with electric motors of the usual type.

If the above problem is well understood, it will be clear that the improvement according to the invention consists mainly in a construction permitting a sealed in rotor of an induction motor. Such a construction is shown in Figures 2 to 6 which illustrates an example and the principles which are used will best be understood by referring to these figures.

One of the new elements which has to be introduced and which is essential consists in an internal housing member 15 which seals the rotor, but which also transmits the electromagnetic induction. Further elements, added to the induction motor, improve the working conditions.

As will be seen from Figure 2 the drive shaft 10 runs in bearings 11, 21. The bearing 11 is held in an annular recess formed by a flange 12 projecting inwardly from the transverse partitioning wall 14 of the inner rotor housing 15. This inner rotor housing is essentially made of magnetically non-permeable material and is provided with magnetically permeable inserts. This housing has the shape of a cylindrical sleeve (Figures 2 and 5) which is completely closed at one end by the partitioning wall 14, but which is open at the other end where it is provided with an outwardly projecting flange 16, by means of which said inner housing may be fixed to other members described below. The construction of the cylindrical wall and especially the way in which the magnetically permeable inserts are fixed in the wall is described below. It will however be noted in Figures 2 and 5 that the end wall 14 of the sleeve has also a further outwardly projecting annular flange 18 enclosing a cavity 19 in which a further bearing 22 for a short shaft 24 is seated.

The second bearing 21 of shaft 10 is seated within a cavity 20 formed within and annular flange 23 projecting from a disk shaped cover or end plate 25 which is fixedly held by the flange 16 of the inner rotor housing 15. The disk shaped cover plate is provided with a central opening and with a number of openings 31 permitting a circulation of gases or fluids.

In front of said disk shaped cover plate 25 a disk 17 may be arranged on the shaft which is spaced from the disk shaped cover plate, but is large enough to face the openings 31, thus preventing turbulence caused by the flow of any liquid into the interior of the inner rotor housing in the event that the motor should be mounted adjacent to a pump or a compressor.

The shaft 10 carries, by means of the hub member 54 and the spokes 51, the cylindrical working or main rotor 20 which, as clearly seen from Figure 2, is entirely contained within the inner rotor chamber 13 formed on the inside of the inner rotor housing 15. The rotor itself may be of the usual squirrel cage construction and may consist of a laminated steel body 20 into which copper bars 26 have been embedded forming the bars of the cage.

The rotor construction however, does not materially differ from known standards. The interior of the rotor is of course exposed to the vapors or fluids. However this will not affect the operation materially. The overwhelming majority of the fluids, whether gaseous or liquid which cause the above named difficulties are dielectrics and therefore do not affect the rotor operation in any way. But even in the event that conductive fluids, such as water, would be used, this fact would not have any appreciable influence on the rotor operation which is determined by the induction in the rotor body.

As above mentioned the partition wall also carries a second bearing 22 journalling a shaft 24, said shaft carrying a small auxiliary rotor 27 by means of the hub member 53 and spokes 52, said rotor being arranged outside of the inner rotor housing 15. The small rotor 27 comprises a rotor body of magnetically permeable material with bars of conductive material, for instance copper, embedded into it. Moreover the rotor carries fan blades 28 adapted to produce a current of cooling air for those parts of the motor which surround the inner rotor housing 15. The shaft 24, on the otherside, is journalled in a bearing 32 which is held in an annular recess 34 surrounded by flanges 36 projecting from the outer or motor housing 35. This housing is provided with openings 38 for the admission of air to the interior by means of the fan. It surrounds the stator 40 completely.

At its other end the outer or motor housing 35 is provided with a flange 39 adapted to be joined to the flange 16 of the inner rotor housing 15. The outer motor housing 35 is moreover provided with a series of openings 41 near said flange 39 through which the air introduced through the openings 38 and driven through the housing by the fan may escape.

Between the outer motor housing 35 and the inner rotor housing 15 the stator 40 is arranged, consisting of a cylindrical stator body 42 made in the well known manner and provided with the usual recesses or indentations 44 between teeth on the inside, said indentations containing the windings 45 of the motor field winding. The stator is moreover provided with a number of longitudinal grooves 46 through which the air circulates along the stator body and which may also serve as a convenient location for longitudinal connection wires between windings.

The stator 40 is separated from the rotor 20, as seen in Figure 2, by the inner rotor housing 15. In order to minimize the effect due to the separation of the stator and rotor this housing 15 is provided with a number of longitudinal slots 48 which face the teeth between the indentations 44 and which are preferably of the same width as the teeth at their outer base. These slots may be stepped and may be somewhat larger at their inner base facing the rotor. The slots have the length of the main squirrel cage rotor and tightly fitting bars 50 of a material of high magnetic permeability are inserted into them filling the slots and are preferably fixed by brazing. When these magnetically permeable bars 50 are fixed and held in the slots of the inner housing 15 the cylindrical wall of the inner housing forms a continuous completely closed imperforate wall. Preferably the inner and outer surfaces of the housing are machined after the bars have been inserted so that the inner and outer surfaces of the housing are rigorously cylindrical without any irregularities.

It will be clear that the bars 50 transmit the magnetic flux to the rotor 20 and thus reduce very materially the resistance which a rotor housing made of non-permeable material would otherwise possess.

Figure 1:
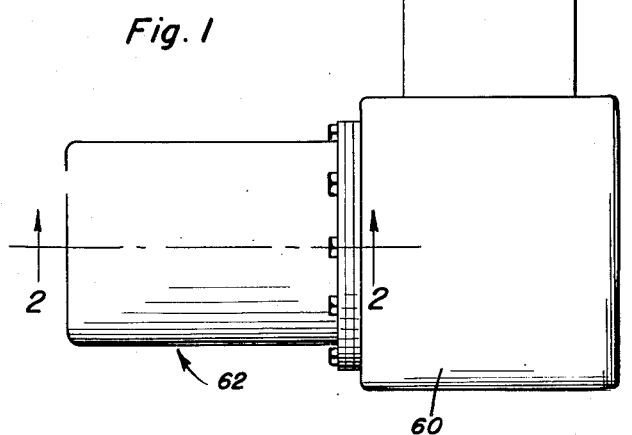
Figure 1 is a diagrammatic elevational view of an electric motor coupled with a pump, compressor or similar fluid containing or fluid conveying device.

The flanges 39, 16 and 25 may all be joined together by means of the bolts 43 which may also serve to join the entire motor unit to the casing 60 of the pump or compressor or other device driven by the motor which is diagrammatically indicated in Figure 1 at 65, the suction or admission pipe being indicated at 63, while the discharge pipe is indicated at 64.

It will be clear from the above description that when the motor unit, generally indicated at 62 in Figure 1 is joined to a compressor casing or pump casing 60 in the way indicated the shaft 10 can penetrate the wall of the casing without a packing or stuffing box or, if such a gland or box is arranged, without a tightly fitting packing gland. Vapors leaking out of the pump or compressor or liquids creeping along the shaft will penetrate into the interior 13 of the housing 15 but cannot go farther as the space 13 is perfectly sealed on the motor side.

The casing may also be without any seal so that the liquid, for instance, may freely circulate through the openings 31, the disk 17 in this case preventing the development of a turbulent movement or of eddies within the gas or liquid.

It will be clear from the above that the example shown may be modified in many respects without in any way departing from the essence of the invention as defined in the annexed claims.

Having described the invention what is claimed as new is:

1. An induction motor for driving a fluid containing device, comprising a stator, a main rotor and rotor shaft driving the said fluid containing device, an inner rotor casing surrounding the said main rotor completely having an imperforate cylindrical wall and an imperforate transverse wall integral therewith, an outer casing surrounding the stator and the inner casing, having a cylindrical wall coaxial and parallel with the cylindrical wall of the inner rotor casing and a perforate transverse wall, parallel to the transverse wall of the inner casing and spaced therefrom, the stator surrounding the inner rotor casing and extending into the space between the transverse walls of the inner and outer casing, said stator being surrounded by the outer casing, an auxiliary shaft, coaxial with the main rotor drive shaft, arranged in the space between the parallel transverse walls of the inner and outer casings, an auxiliary rotor on said shaft arranged in the space surrounded by the stator, a fan on said auxiliary shaft driven by said auxiliary rotor, said fan being turned towards and arranged near the perforated transverse wall of the outer casing, said fan aspirating air from without though the perforated transverse wall and driving said air longitudinally through the space between the two casings.

2. An induction motor as claimed in claim 1, wherein the stator is provided with air conducting cooling grooves running longitudinally along the stator, said grooves conducting the air pressed into them by the fan driven by the auxiliary rotor.

3. An induction motor for driving a fluid containing device comprising a cylindrical stator body carrying windings, a main rotor and rotor shaft driving the fluid containing device, an inner rotor casing surrounding the said main rotor and rotor shaft completely, said casing being provided with magnetically permeable inserts and arranged between the stator body and the main rotor, said casing being provided with an imperforate cylindrical wall consisting of magnetically non-permeable material provided with magnetically permeable inserts facing the windings of the stator body, and an imperforate transverse wall at one end integral with the aforesaid cylindrical wall of the inner casing, said inner casing being further provided with outwardly projecting flanges at one end of the cylindrical wall, an outer casing surrounding the stator body and the inner casing having a cylindrical wall coaxial with the cylindrical wall of the inner rotor casing and a perforate transverse wall at one end parallel to the transverse wall of the inner casing and spaced therefrom, flanges on said outer casing fixedly connected with the flanges of the inner rotor casing, said outer casing being further provided with openings near said flanges for the discharge of air passing along the stator body, the stator body and windings surrounding the inner casing and extending into the space between the transverse walls of the inner and outer casings, longitudinal grooves in said stator body leading from the space between the transverse wall towards the opening near the flanges, an auxiliary shaft coaxial with the main rotor drive shaft, arranged in the space between the parallel transverse walls of the inner and the outer casings, an auxiliary rotor on said auxiliary shaft surrounded by that part of the stator which projects into the space between the two transverse walls, a fan on said auxiliary shaft driven by said auxiliary rotor, said fan being arranged near the perforate transverse wall of the outer casing, said fan aspirating the air and driving the same through the cooling grooves of the stator towards the openings arranged near the flanges of the outer casing.

JOHN C. HOLST.

References Cited in the file of this patent
UNITED STATES PATENTS

| Number | Name | Date |
| --- | --- | --- |
| 953,219 | Muller | Mar. 29, 1910 |
| 1,722,284 | Fisher | July 30, 1929 |
| 1,908,620 | Zorzi | May 9, 1933 |
| 2,497,650 | Anderson | Feb. 14, 1950 |
| 2,517,233 | Peters | Aug. 1, 1950 |